US010437920B2

(12) United States Patent
Feng et al.

(10) Patent No.: US 10,437,920 B2
(45) Date of Patent: Oct. 8, 2019

(54) AIDED TRANSLATION METHOD AND DEVICE THEREOF

(71) Applicant: WUXI WUXIN NETWORK TECHNOLOGY CO., LTD., Wuxi, Jiangsu (CN)

(72) Inventors: Zhong Feng, Jiangsu (CN); Jiuzhen Liang, Jiangsu (CN); Jinsheng Zhou, Jiangsu (CN); Zhiyuan Xu, Jiangsu (CN); Feimin Yang, Jiangsu (CN)

(73) Assignee: WUXI WUXIN NETWORK TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 15/247,890

(22) Filed: Aug. 25, 2016

(65) Prior Publication Data

US 2018/0060290 A1    Mar. 1, 2018

(51) Int. Cl.
*G06F 17/24* (2006.01)
*G06F 17/28* (2006.01)
*G06Q 50/10* (2012.01)

(52) U.S. Cl.
CPC .......... *G06F 17/243* (2013.01); *G06F 17/289* (2013.01); *G06Q 50/10* (2013.01)

(58) Field of Classification Search
CPC .... G06F 17/243; G06F 3/0482; G06F 17/248; G06F 17/289
See application file for complete search history.

(56) References Cited

U.S. PATENT DOCUMENTS

| | | | | |
|---|---|---|---|---|
| 6,092,035 A * | 7/2000 | Kurachi | ............... | G06F 17/2872 704/3 |
| 7,802,724 B1 * | 9/2010 | Nohr | ................... | G07C 9/00111 235/384 |
| 2001/0012992 A1 * | 8/2001 | Kimpara | ............... | G06F 17/289 704/5 |
| 2002/0002452 A1 * | 1/2002 | Christy | ............... | G06F 17/2872 704/3 |
| 2002/0169692 A1 * | 11/2002 | Dutta | ..................... | G06Q 10/10 708/5 |
| 2006/0120607 A1 * | 6/2006 | Lev | ..................... | G06K 9/00624 382/217 |
| 2006/0277222 A1 * | 12/2006 | Dickinson | ......... | G06F 17/30569 |
| 2007/0233547 A1 * | 10/2007 | Younger | ............... | G06F 17/248 705/7.14 |

(Continued)

*Primary Examiner* — Asher D Kells (57) ABSTRACT

An aided translation method and a device thereof, belonging to the field of Human-Computer Interaction. The method comprises the steps of: obtaining a destination from the itinerary information of a user; translating the pre-stored personal form-filling information of the user from a source language to a target language when the language of the destination is different from that of the user's usual place of residence, wherein, the target language is the language of the destination; and displaying the personal form-filling information in the target language. The method and a device solve the problem of users in filling in the arrival/departure card caused by unfamiliarity with foreign languages and the form-filling formats, and achieve an effect that users can fill in the arrival/departure card easily by reference to the personal form-filling information displayed in the target language.

6 Claims, 10 Drawing Sheets

Before departure

After departure (56) References Cited

U.S. PATENT DOCUMENTS

| | | | |
|---|---|---|---|
| 2010/0051679 A1* | 3/2010 | Molloy | G06Q 10/10 |
| | | | 235/375 |
| 2012/0036077 A1* | 2/2012 | Quinn, Jr. | G06Q 10/10 |
| | | | 705/310 |
| 2012/0304060 A1* | 11/2012 | Kompalli | G06K 9/00 |
| | | | 715/709 |
| 2013/0050533 A1* | 2/2013 | Park | G06K 9/3258 |
| | | | 348/239 |
| 2013/0201307 A1* | 8/2013 | Schloter | H04N 5/23293 |
| | | | 348/61 |
| 2013/0293577 A1* | 11/2013 | Perez | G02B 27/017 |
| | | | 345/633 |
| 2014/0108456 A1* | 4/2014 | Ramachandrula | |
| | | | G06K 9/00449 |
| | | | 707/779 |
| 2015/0193701 A1* | 7/2015 | Sohn | G06Q 10/02 |
| | | | 705/5 |
| 2016/0078581 A1* | 3/2016 | Maher | G06Q 50/265 |
| | | | 705/325 |
| 2016/0241707 A1* | 8/2016 | Lee | H04M 1/72577 |

* cited by examiner

Before departure

Ticket
xxx xxx x xxx xxx
xxxxxxxxxxxxxxx

10:14

Shoot the air ticket whitin the dashed box

Air ticket
Xxx xxx xxx

After departure

10:14

Reference for filling in the arrival/departure card (in English)

| | |
|---|---|
| Family Name | WANG |
| First Name and Middle Name | SAN |
| Nationality | China |
| Passport No. | N123456789 |
| Date of Birth | 1960-04-01 |
| Visa No. | LXXXXX |
| Flight No. | DJ4535 |
| Address | Room 302 Building3 Changping District |

AIDED TRANSLATION METHOD AND DEVICE THEREOF

TECHNICAL FIELD

The Invention relates to the field of human-computer interaction and particularly relates to an aided translation method and device thereof.

BACKGROUND

Arrival/departure card is one of the forms to be filled in for leaving or entering a country. The arrival/departure card can be either a departure card or an arrival card.

Citizens are required to fill in the arrival/departure cards of different countries before leaving or entering the countries; therefore, they shall fill in the arrival/departure cards of non-native countries with foreign languages. The current method for users to fill in the arrival/departure cards of non-native countries is to translate the personal information into a foreign language and then fill the translated personal information into the corresponding location of the arrival/departure cards.

While implementing the embodiments of the Invention, the Inventor found at least the following problem in the prior art: some users, who leave or enter a country temporarily, might not be familiar with the foreign languages, nor the form-filling formats; therefore, as they have much trouble in filling in the arrival/departure cards, they even need to ask a service staff to help them.

SUMMARY OF THE INVENTION

The embodiments of the Invention provide an aided translation method and device thereof to solve the problem of users in filling in the arrival/departure card caused by unfamiliarity with foreign languages and the form-filling formats. The technical scheme is as follows:

On one hand, the Invention provides an aided translation method, wherein, the method comprises the steps of:

obtaining a destination from the itinerary information of a user;

translating the pre-stored personal form-filling information of the user from a source language to a target language when the language of the destination is different from that of the user's usual place of residence, wherein, the target language is the language of the destination;

displaying the personal form-filling information in the target language.

Optionally, the step of obtaining a destination from the itinerary information of a user comprises the step of:

obtaining an image containing an itinerary ticket of the user and identifying the itinerary information from the image; extracting the destination from the itinerary information;

or, obtaining the itinerary information of the user in electronic form; extracting the destination from the itinerary information.

Optionally, the step of obtaining an image containing the itinerary ticket of the user and identifying the itinerary information from the image comprises the steps of:

shooting to obtain an image of the itinerary ticket in the shooting mode selected by the user, wherein, different types of the itinerary ticket have different shooting modes;

capturing at least one area for identification from the image using a template corresponding to the type of the itinerary ticket;

identifying the itinerary information from the at least one area for identification.

Optionally, the method further comprises the steps of:

obtaining the time information from the itinerary information;

translating the pre-stored personal form-filling information of the user from a source language to a target language when the language of the destination is different from that of the user's usual place of residence, wherein comprising the steps of:

sending the destination and the time information to a server;

receiving the personal form-filling information in the target language fed back by the server before the time specified by the time information; the personal form-filling information in the target language is obtained by translating the pre-stored personal form-filling information of the user from a source language with the server when the language of the destination is different from that of the user's usual place of residence;

buffering the personal form-filling information in the target language.

Optionally, the step of displaying the personal form-filling information in the target language comprises the steps of:

receiving the selection signal of the user in case there are multiple items of the personal form-filling information in the target language;

displaying the selected personal form-filling information in the target language in association with the form template corresponding to the destination based on the selection signal.

On the other hand, the Invention provides an aided translation device, wherein, the device comprises:

a destination obtaining module, for obtaining a destination from the itinerary information of a user;

an information translating module, for translating the pre-stored personal form-filling information of the user from a source language to a target language when the language of the destination is different from that of the user's usual place of residence, wherein, the target language is the language of the destination;

an information displaying module, for displaying the personal form-filling information in the target language.

Optionally, the destination obtaining module comprises:

an information identifying unit, for obtaining an image containing the itinerary ticket of the user and identifying the itinerary information from the image; a destination extracting unit, for extracting the destination from the itinerary information;

or, an information obtaining unit, for obtaining the itinerary information of the user in electronic form; a destination extracting unit, for extracting the destination from the itinerary information.

Optionally, the information identifying unit comprises:

an image shooting sub-unit, an area capturing sub-unit and an information identifying sub-unit;

the image shooting sub-unit is used for shooting to obtain an image of the itinerary ticket in the mode selected by the user, wherein, different types of itinerary ticket have different shooting modes;

the area capturing sub-unit is used for capturing at least one area for identification from the image using a template corresponding to the type of the itinerary ticket;

the information identifying sub-unit is used for identifying the itinerary information from the at least one area for identification.

Optionally, the device further comprises:

a time obtaining unit, for obtaining the time information from the itinerary information;

the information translating module comprises:

an information sending unit, an information receiving unit and an information buffering unit;

the information sending unit is used for sending the destination and the time information to a server;

the information receiving unit is used for receiving the personal form-filling information in the target language fed back by the server before the time specified by the time information; the personal form-filling information in the target language is obtained by translating the pre-stored personal form-filling information of the user from a source language with the server when the language of the destination is different from that of the user's usual place of residence;

the information buffering unit is used for buffering the personal form-filling information in the target language.

Optionally, the information displaying module comprises:

an information receiving unit, for receiving the selection signal of the user in case there are multiple items of personal form-filling information in the target language;

an associated displaying unit, for displaying the selected personal form-filling information in the target language in association with the form template corresponding to the destination based on the selection signal.

The beneficial effect of the technical scheme provided by the embodiments of the Invention is that:

through obtaining a destination from the itinerary information of a user; translating the pre-stored personal form-filling information of the user from a source language to a target language when the language of the destination is different from that of the user's usual place of residence, wherein, the target language is the language of the destination; and displaying the personal form-filling information in the target language, it solves the problem of users in filling in the arrival/departure cards caused by unfamiliarity with foreign languages and the form-filling formats and achieves an effect that users can fill in the arrival/departure card easily by reference to the personal form-filling information displayed in the target language.

BRIEF DESCRIPTION OF THE DRAWINGS

In order to illustrate the technical scheme in the embodiments of the Invention more clearly, the drawings in the description of the embodiments will be introduced briefly as follows. Obviously, the drawings in the following description are just a part of the embodiments of the Invention. A person skilled in the art is able to obtain other drawings according to these drawings without any creative work.

DETAILED DESCRIPTION OF THE PREFERRED EMBODIMENT

The embodiments of the Invention will be further described in combination with the drawings as follows to make clearer the purpose, technical scheme and advantages of the Invention.

Figure 1:
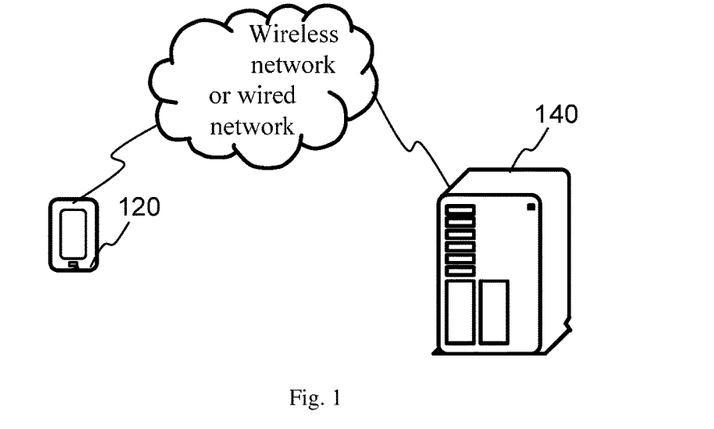
FIG. 1 is a structure diagram of an implementation environment involved in the aided translation method provided by the embodiments of the Invention.

Referring to FIG. 1, a structure diagram of an implementation environment involved in the aided translation method is provided for the embodiments of the Invention. The implementation environment comprises a mobile terminal 120 and a server 140.

The mobile terminal 120 can be a mobile phone, a tablet PC, an E-book reader, a MP3 player (Moving Picture Experts Group Audio Layer III), a MP4 player (Moving Picture Experts Group Audio Layer IV) and a laptop computer, etc.

The mobile terminal 120 and the server 140 are connected through wireless or wired networks.

The server 140 is a server, or a server cluster composed of several servers, or a cloud computing service center.

Figure 2:
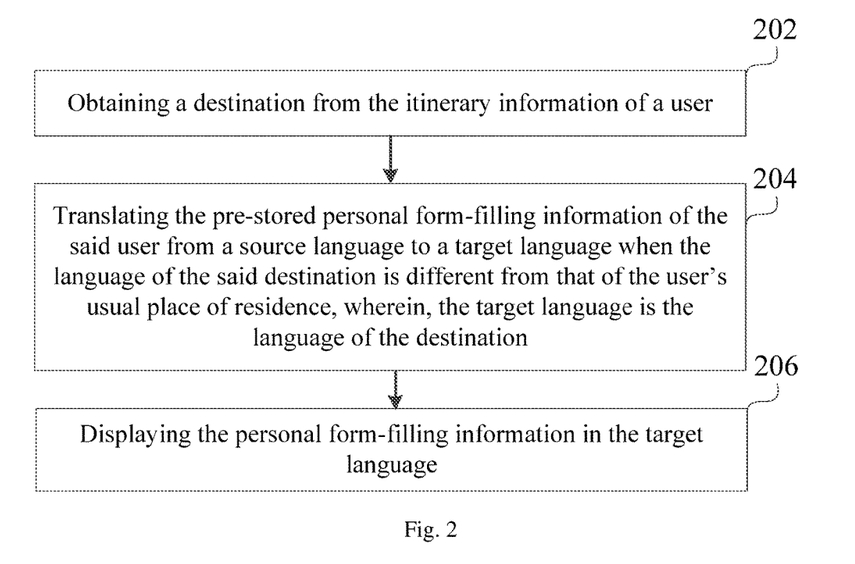
FIG. 2 is a flow chart of the aided translation method provided by an embodiment of the Invention.

Referring to FIG. 2, a flow chart of the aided translation method is provided for an embodiment of the Invention. The embodiment is described in the way of applying the aided translation method to the mobile terminal shown in FIG. 1. The aided translation method comprises:

Step 202, obtaining a destination from the itinerary information of a user;

Step 204, translating the pre-stored personal form-filling information of the user from a source language to a target language when the language of the destination is different from that of the user's usual place of residence, wherein, the target language is the language of the destination;

Step 206, displaying the personal form-filling information in the target language.

In conclusion, the aided translation method provided by the embodiment is that: through obtaining a destination from the itinerary information of a user; translating the pre-stored personal form-filling information of the user from a source language to a target language when the language of the destination is different from that of the user's usual place of residence, wherein, the target language is the language of the destination, and displaying the personal form-filling information in the target language, it solves the problem of users in filling in the arrival/departure card caused by unfamiliarity with foreign languages and the form-filling formats and achieves an effect that users can fill in the arrival/departure card easily by reference to the personal form-filling information displayed in the target language.

Figure 3A:
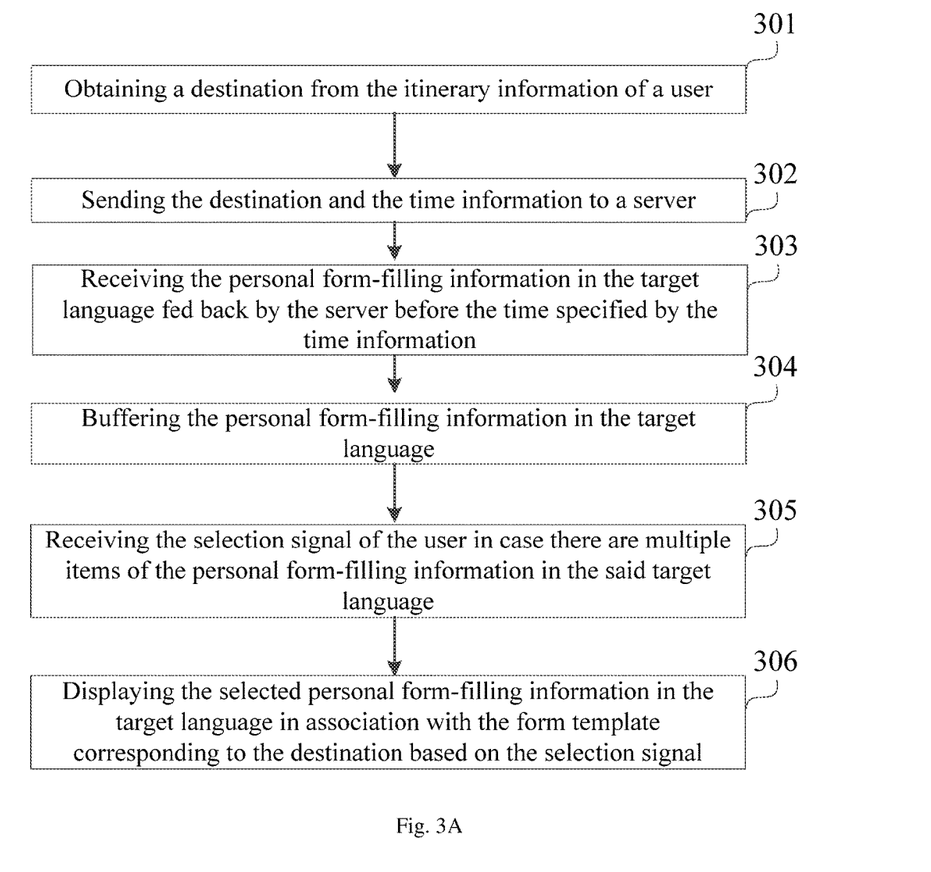
FIG. 3A is a flow chart of the aided translation method provided by another embodiment of the Invention.

Please refer to FIG. 3A, a flow chart of the aided translation method provided by another embodiment of the Invention. The embodiment is described in the way of applying the aided translation method to the mobile terminal shown in FIG. 1. The aided translation method comprises:

Step 301, obtaining a destination and time information from the itinerary information of a user;

The itinerary information may be obtained from two ways: i.e., electronic itinerary information and real itinerary tickets. Wherein, the real itinerary tickets comprise air ticket and bus ticket. The two ways are described respectively as follows:

Firstly, the mobile terminal obtains the itinerary information of the user in electronic form and extracts the destination and time information from the itinerary information.

The mobile terminal may obtain the itinerary information of the user in electronic form, such as electronic air tickets, from SMS, E-mail and itinerary apps, and then extract the destination and time information from the itinerary information in regular expression. For example, it may extract the destination "New York" and the departure date May 1, 2014 from the electronic air ticket.

Secondly, the mobile terminal obtains the image containing the itinerary ticket of the user, identifies the itinerary information from the image and extracts the destination from the itinerary information.

The mobile terminal may also obtain the itinerary information of the user from the real itinerary tickets. In particular, it includes the following steps:

1. The mobile terminal shoots to obtain an image of the itinerary ticket in the shooting mode selected by the user, wherein, different types of itinerary ticket have different shooting modes;

The real itinerary tickets as bus ticket and air ticket have fixed formats, therefore, the mobile terminal provides several shooting modes for ordinary bus tickets, bullet train ticket and air ticket, etc.; different types of itinerary ticket have different shooting modes; the mobile terminal obtains the image of the itinerary ticket in the shooting mode selected by the user.

Figure 3B:
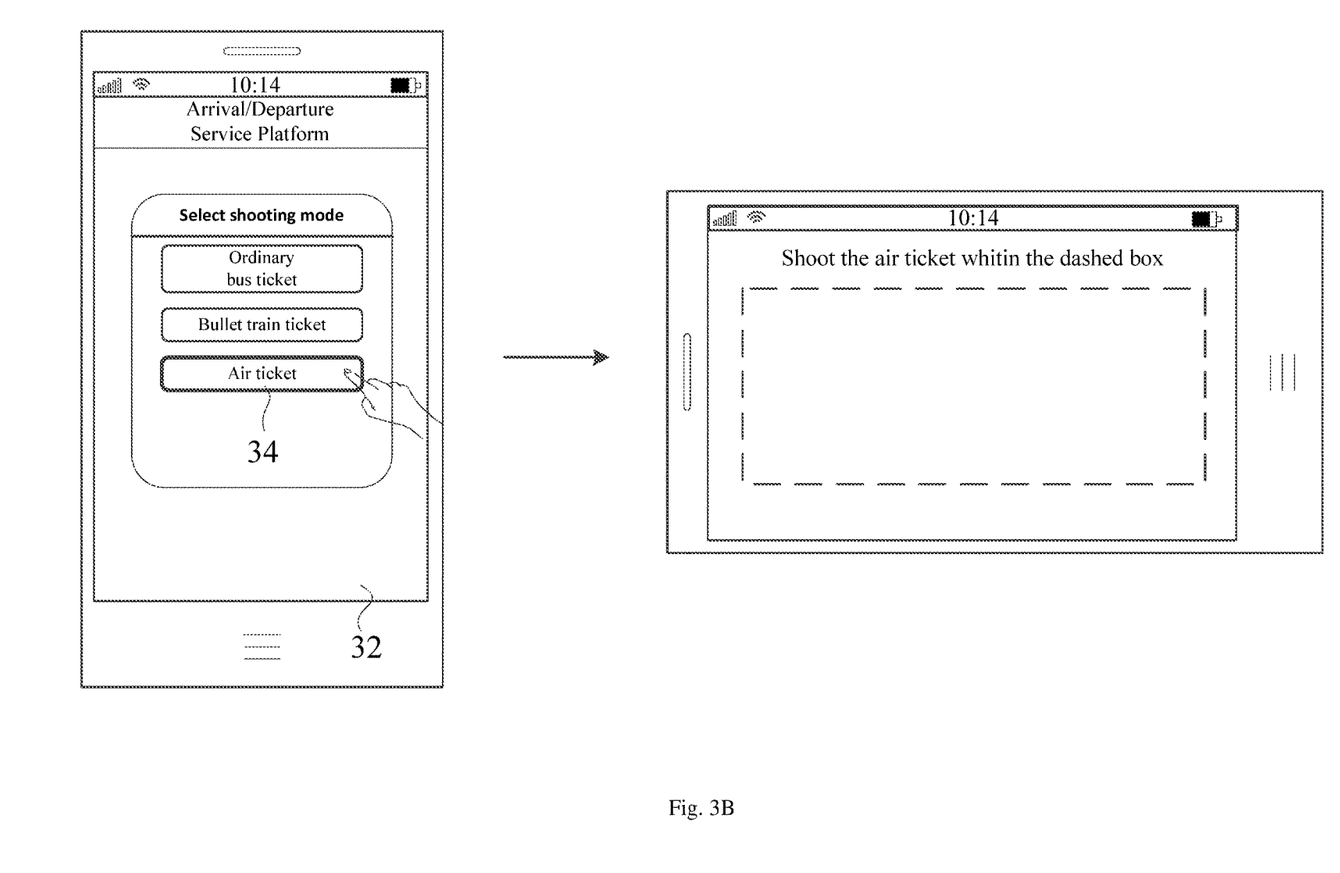
FIGS. 3B-3F are the schematic diagrams involved in a concrete implementation of the aided translation method provided by the embodiment showed in FIG. 3A.

For example, as shown in FIG. 3B, the user selects the air ticket shooting mode 34 displayed on the mobile phone interface 32 to shoot the air ticket.

2. The mobile terminal captures at least one area for identification from the image using a template corresponding to the type of the itinerary ticket;

After obtaining the image of the itinerary ticket, the mobile terminal captures at least one area for identification from the image using a template corresponding to the type of the itinerary ticket. The type of the itinerary ticket can be obtained in the mode selected by the user.

For example, the mobile phone captures the areas for identification corresponding to "airline", "flight number", "departure station", "arrival station", "departure date" and "seat number" from the image.

3. The mobile terminal identifies the itinerary information from at least one area for identification;

Then, the mobile terminal identifies the itinerary information from each area for identification. The mobile terminal pre-sets different templates for all areas for identification, for example, with regard to the area for identification of "airline", it uses the names of all airlines at the user's usual place of residence to get a template through preliminary training; with regard to the area for identification of "flight number", it gets a template with the digits and coding formats corresponding to the flight number through preliminary training of capital letters and Arabic numerals. Then, it identifies a certain area for identification through the corresponding template of the area. Thus, it can not only improve the accuracy of identification, but also increase the speed for identification and reduce the calculated amount and finish the identification with only a mobile terminal without any server.

4. The mobile terminal extracts the destination and time information from the itinerary information.

After identifying the itinerary information, the mobile terminal will extract the destination and time information from the itinerary information.

Step 302, sending the destination and the time information to a server;

The mobile terminal sends the destination and the time information to the server. Preferably, the mobile terminal determines whether the language of the destination is different from that of the user's usual place of residence. The user's usual place of residence can be set by the user in advance, or, calculated through the statistics of the geographical locations positioned in a historical time quantum by the mobile terminal. In case the language of the destination is different from that of the user's usual place of residence, the mobile terminal will send the destination and the time information to the server.

Correspondingly, the server will receive the destination and the time information sent by the mobile terminal. The server determines the target language of the destination and translates the pre-stored personal form-filling information of the user from the source language to the target language. The personal form-filling information normally comprises: name, sex, nationality, date of birth, place of birth and passport number, etc.

For example, in case that the usual place of residence of the user is Jiangsu, China and the destination is New York, America, the server will determine that the target language is English according to New York, America, and then translate the pre-stored personal form-filling information of the user from Chinese to English.

After translation, the server feeds back the personal form-filling information in the target language to the mobile terminal. Preferably, the server feeds back the personal form-filling information in the target language to the mobile terminal before the date specified by the time information. Time information refers to the departure date in the itinerary information.

The mobile terminal and the server can identify the personal form-filling information through the user's account.

Preferably, the server can also feed back the form template of the corresponding destination to the mobile terminal. For example, the server feeds back the form template of the arrival/departure card of Now York, America. Certainly, the form template of each corresponding district can be locally buffered by the mobile terminal in advance in software installation.

Step 303, receiving the personal form-filling information in the target language fed back by the server before the time specified by the time information;

The mobile terminal receives the personal form-filling information in the target language fed back by the server before the time specified by the time information. And, the mobile terminal receives the form template of the corresponding destination fed back by the server.

Wherein, the personal form-filling information in the target language is obtained by translating the pre-stored personal form-filling information of the user from the source language with the server when the language of the destination is different from that of the user's usual place of residence.

Step 304, buffering the personal form-filling information in the target language;

The mobile terminal buffers the personal form-filling information in the target language.

Step 305, receiving the selection signal of the user in case there are multiple items of the personal form-filling information in the target language;

Then, the user can view the personal form-filling information in the target language buffered by the mobile terminal when filling in the form (such as the arrival/departure card). As there are multiple items of form-filling information in the target language buffered by the mobile terminal, the user can select one item that needs to be displayed currently.

Figure 3C:
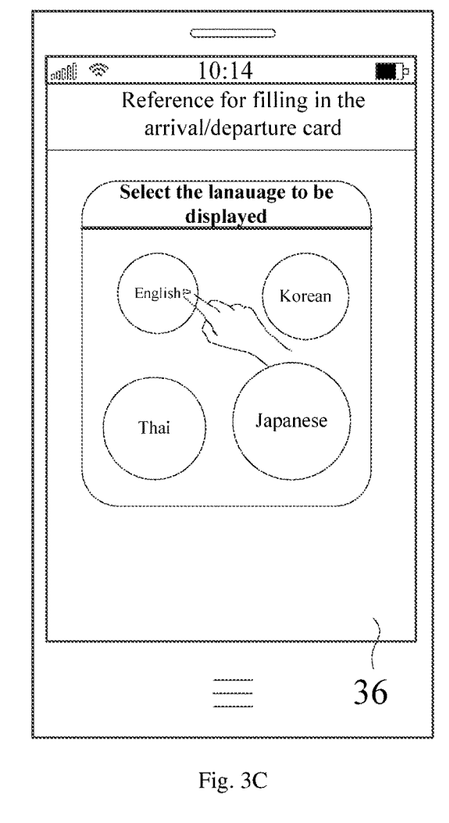

For example, as shown in FIG. 3C, the mobile phone of user A buffers the personal form-filling information in English, Korean, Thai language, Japanese, Malaysia language, etc. Then user A shall click on the interface 36 to select the personal form-filling information to be displayed currently.

However, in general, the user will enter only one country within a period of time, therefore the mobile terminal can determine to display the personal form-filling information in the target language based on the latest itinerary information by default. In other words, the mobile terminal can display the default personal form-filling information in the target language directly without executing Step 305.

Step 306, displaying the selected personal form-filling information in the target language in association with the form template corresponding to the destination based on the selection signal.

The mobile terminal displays the selected personal form-filling information in the target language in association with the form template corresponding to the destination based on the selection signal. There are two ways for associated displaying:

Firstly, the personal form-filling information in the target language can be displayed in the way of adapting to the screen of the mobile terminal after each information item is associated to the corresponding form item.

Figure 3D:
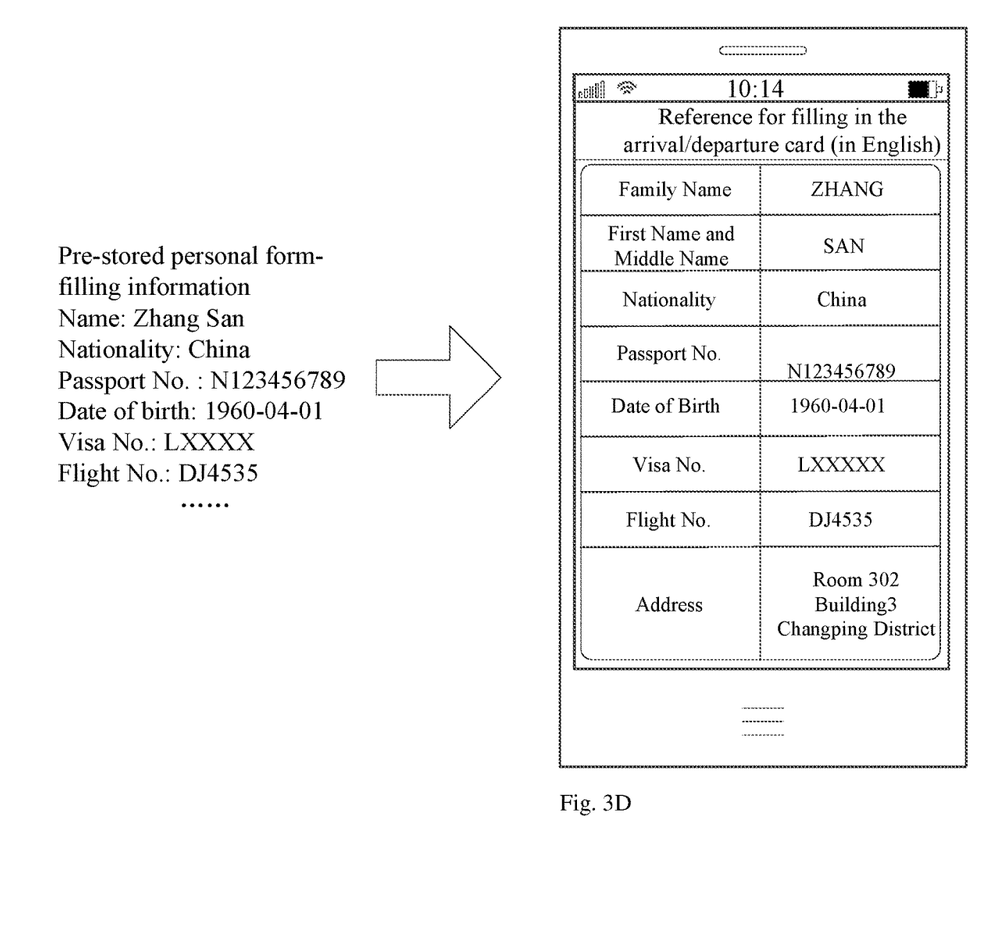

For example, as shown in FIG. 3D, the mobile phone with a small screen displays the form-filling information in the target language in the way of adapting to the screen after each information item is associated to the corresponding form item.

Secondly, the information items in the form-filling information in the target language corresponding to the form items are displayed in the way of being superimposed in the specified locations automatically according to the coordinates of the form items in the form.

Figure 3E:
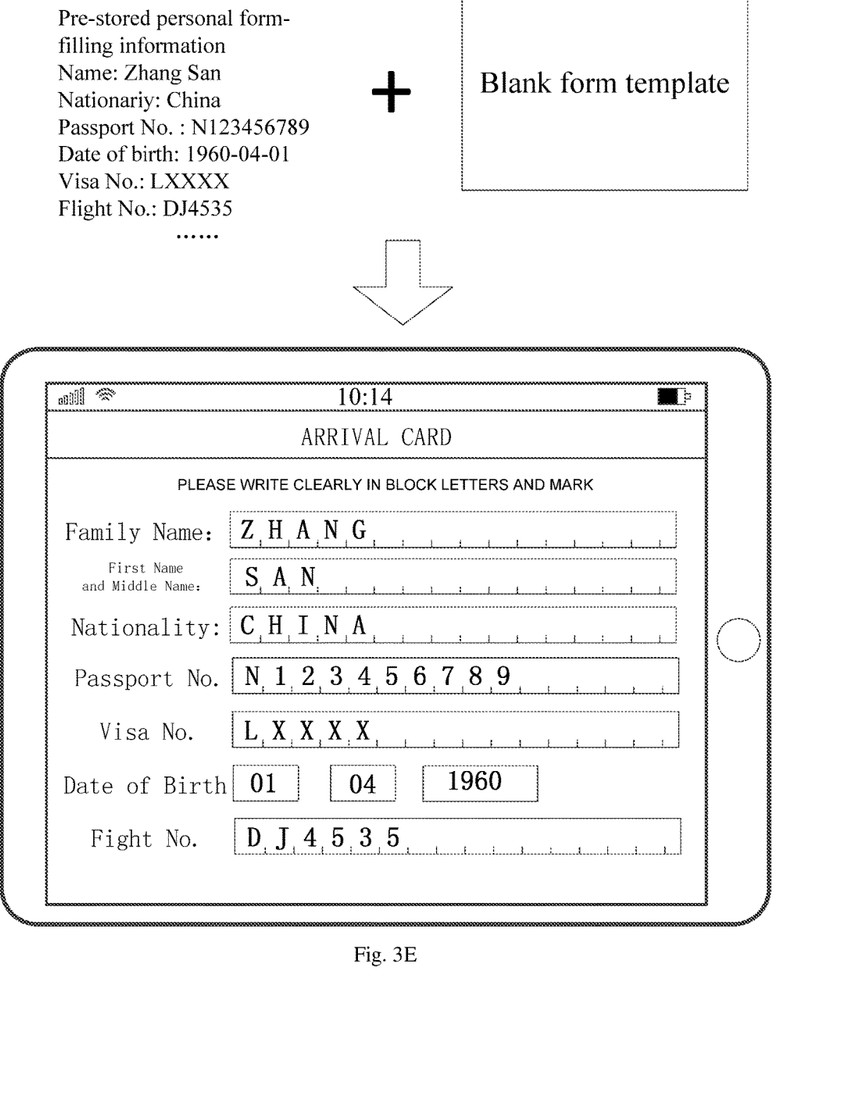

For example, the information items in the form-filling information in the target language corresponding to the form items are displayed by the mobile phone with large screen or a tablet PC in the way of being superimposed in the specified locations automatically. In other word, as shown in FIG. 3E, the form-filling information is displayed in the way of simulating the actual effect of form filling.

Wherein, the form item refers to the individual item to be filled in the user's information form, comprising: name, sex, nationality, date of birth, place of birth, passport number, visa number, flight number and place of residence after entering the country. The form items involved in different forms are fixed and only the arrangements in individual form are slightly different.

At last, the user can fill in the form based on the displayed personal form-filling information in the target language.

In conclusion, the aided translation method provided by the embodiment is that: through obtaining a destination from the itinerary information of a user; translating the pre-stored personal form-filling information of the user from a source language to a target language when the language of the destination is different from that of the user's usual place of residence, wherein, the target language is the language of the destination, and displaying the personal form-filling information in the target language, it solves the problem of users in filling in the arrival/departure card caused by unfamiliarity with foreign languages and the form-filling formats and achieves an effect that users can fill in the arrival/departure card easily by reference to the personal form-filling information displayed in the target language.

The aided translation method provided by the embodiment obtains the image of the itinerary ticket in the shooting mode selected by the user, captures at least one area for identification from the image using a template corresponding to the type of the itinerary ticket, and identifies the itinerary information from at least one area for identification. Through making full use of the characteristics of the fixed format of the itinerary information, it not only improves the accuracy of identification, but also increases the speed for identification and reduces the calculated amount and finish the identification with only a mobile terminal without any server.

The aided translation method provided by the embodiment also buffers the personal form-filling information in the target language into the mobile terminal before the date of departure; in this way, it solves the problem that online translation cannot be achieved on account that the network communication is unavailable when the mobile terminal arrives at the destination. It achieves the effect of displaying the personal form-filling information in the target language even if the network communication is unavailable when the mobile terminal arrives at the destination.

The aided translation method provided by the embodiment also displays the selected personal form-filling information in the target language in association with the form item for the user to fill in the relevant form by reference to the eventual displayed content easily even if the user is unfamiliar with the target language or the form-filling format.

Figure 3F:
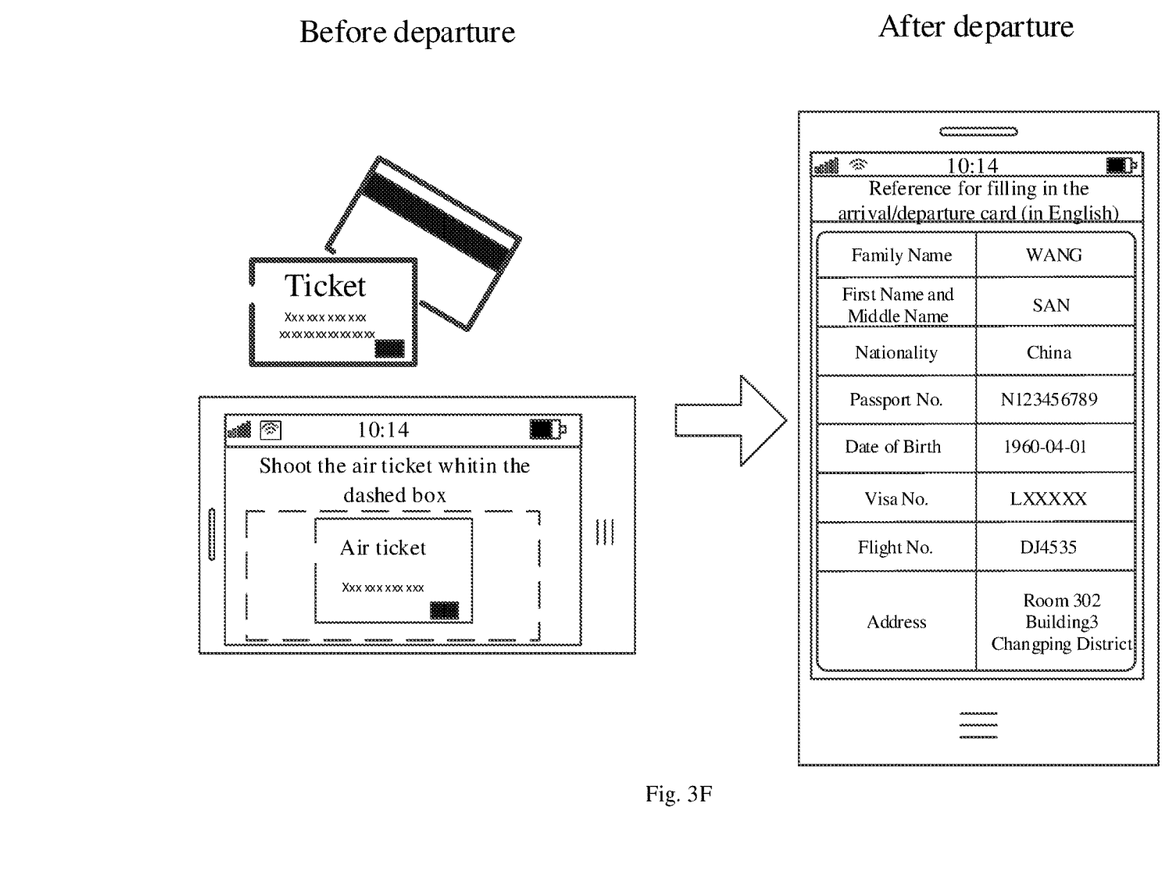

As shown in the specific example in FIG. 3F, Mr. Wang needs to depart China and enter America for business. After purchasing the air ticket, Mr. Wang takes a picture of the air ticket with a mobile phone and the mobile phone identifies his itinerary information and translates his personal form-filling information from Chinese to English and buffers the translated information. When Mr. Wang arrives in America, he can fill in the form by reference to the filled form displayed on the mobile phone.

Figure 4:
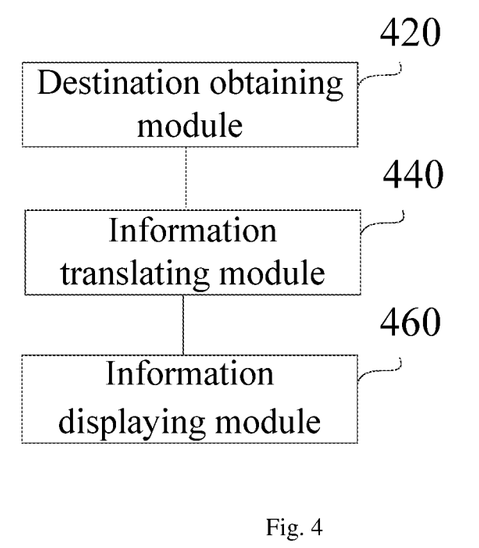
FIG. 4 is a structure diagram of the aided translation device provided by an embodiment of the Invention.

Please refer to FIG. 4, a structure diagram of the aided translation device provided by an embodiment of the Invention. The aided translation device can be all or a part of the mobile terminal through a software or a hardware or the combination of the two. The device comprises:

a destination obtaining module 420, for obtaining a destination from the itinerary information of a user;

an information translating module 440, for translating the pre-stored personal form-filling information of the user from a source language to a target language when the language of the destination is different from that of the user's usual place of residence, wherein, the target language is the language of the destination;

an information displaying module 460, for displaying the personal form-filling information in the target language.

In conclusion, the aided translation device provided by the embodiment is that: through obtaining a destination from the itinerary information of a user; translating the pre-stored personal form-filling information of the user from a source language to a target language when the language of the destination is different from that of the user's usual place of residence, wherein, the target language is the language of the destination, and displaying the personal form-filling information in the target language, it solves the problem of users in filling in the arrival/departure card caused by unfamiliarity with foreign languages and the form-filling formats and achieves an effect that users can fill in the arrival/departure card easily by reference to the personal form-filling information displayed in the target language.

Figure 5:
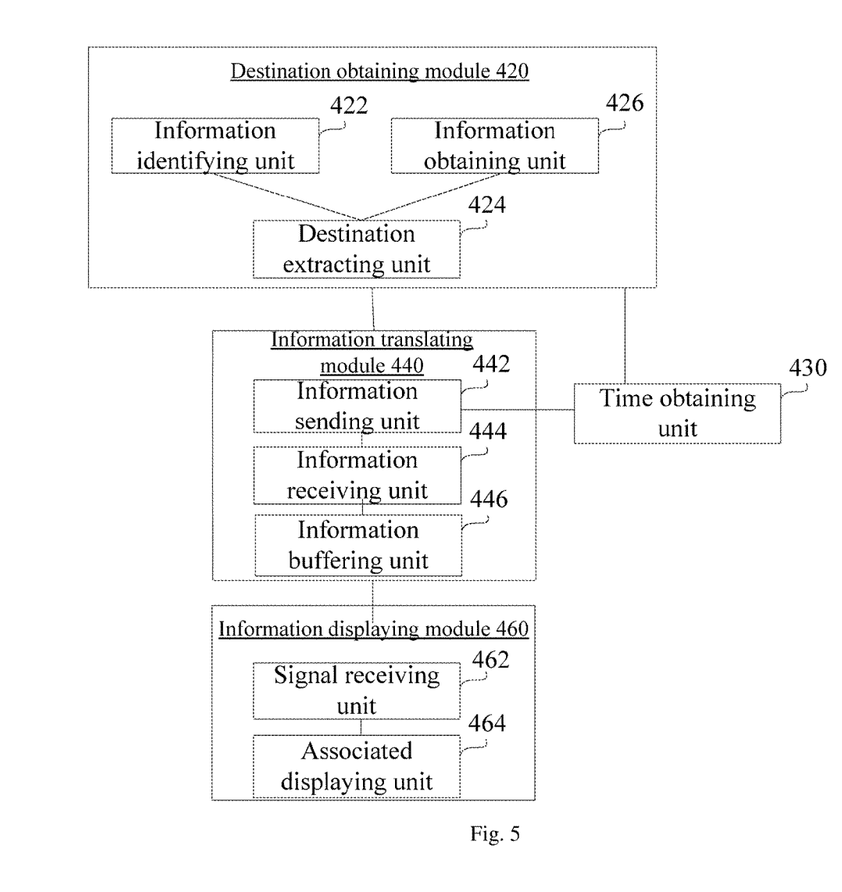
FIG. 5 is a structure diagram of the aided translation device provided by another embodiment of the Invention.

Please refer to FIG. 5, a structure diagram of the aided translation device provided by another embodiment of the Invention. The aided translation device can be all or a part of the mobile terminal through a software or a hardware or the combination of the two. The device comprises:

a destination obtaining module 420, for obtaining a destination from the itinerary information of a user;

an information translating module 440, for translating the pre-stored personal form-filling information of the user from a source language to a target language when the language of the destination is different from that of the user's usual place of residence, wherein, the target language is the language of the destination;

an information displaying module 460, for displaying the personal form-filling information in the target language.

Optionally, the destination obtaining module 420 comprises:

an information identifying unit 422, for obtaining an image containing the itinerary ticket of the user and identifying the itinerary information from the image; a destination extracting unit 424, for extracting the destination from the itinerary information;

or, an information obtaining unit 426, for obtaining the itinerary information of the user in electronic form; a destination extracting unit 424, for extracting the destination from the itinerary information.

Optionally, the information identifying unit 422 comprises:

an image shooting sub-unit, an area capturing sub-unit and an information identifying sub-unit;

Wherein, the image shooting sub-unit is used for shooting to obtain an image of the itinerary ticket in the mode selected by the user; wherein, different types of itinerary ticket have different shooting modes;

the area capturing sub-unit is used for capturing at least one area for identification from the image using a template corresponding to the type of the itinerary ticket;

the information identifying sub-unit is used for identifying the itinerary information from at least one area for identification.

Optionally, the aided translation device further comprises:

a time obtaining unit 430, for obtaining the time information from the itinerary information;

an information translating module 440, comprising:

an information sending unit 442, an information receiving unit 444 and an information buffering unit 446;

Wherein, the information sending unit 442 is used for sending the destination, the time information in the itinerary information to a server;

the information receiving unit 444 is used for receiving the personal form-filling information in the target language fed back by the server before the time specified by the time information; the personal form-filling information in the target language is obtained by translating the pre-stored personal form-filling information of the user from a source language with the server when the language of the destination is different from that of the user's usual place of residence;

the information buffering unit 446 is used for buffering the personal form-filling information in the target language.

Optionally, the information displaying module 460 comprises:

an information receiving unit 462, for receiving the selection signal of the user in case there are multiple items of personal form-filling information in the target language;

an associated displaying unit 464, for displaying the selected personal form-filling information in the target language in association with the form template corresponding to the destination based on the selection signal.

In conclusion, the aided translation device provided by the embodiment is that: through obtaining a destination from the itinerary information of a user; translating the pre-stored personal form-filling information of the user from a source language to a target language when the language of the destination is different from that of the user's usual place of residence, wherein, the target language is the language of the destination, and displaying the personal form-filling information in the target language, it solves the problem of users in filling in the arrival/departure card caused by unfamiliarity with foreign languages and the form-filling formats and achieves an effect that users can fill in the arrival/departure card easily by reference to the personal form-filling information displayed in the target language.

The aided translation device provided by the embodiment obtains the image of the itinerary ticket in the shooting mode selected by the user, captures at least one area for identification from the image using a template corresponding to the type of the itinerary ticket and identifies the itinerary information from at least one area for identification. Through making full use of the characteristics of the fixed format of the itinerary information, it not only improves the accuracy of identification, but also increases the speed for identification and reduces the calculated amount and finish the identification with only a mobile terminal without any server.

The aided translation device provided by the embodiment also buffers the personal form-filling information in the target language into the mobile terminal before the date of departure; in this way, it solves the problem that online translation cannot be achieved on account that the network communication is unavailable when the mobile terminal arrives at the destination. It achieves the effect of displaying the personal form-filling information in the target language even if the network communication is unavailable when the mobile terminal arrives at the destination.

The aided translation device provided by the embodiment also displays the selected personal form-filling information in the target language in association with the form item for the user to fill in the relevant form by reference to the eventual displayed content easily even if he/she is unfamiliar with the target language or the form-filling format.

It shall be noted that, the aided translation device provided by the above embodiments is illustrated based on the division of the above functional modules for assistance in translating the personal form-filling information. In practical application, the above functions can be allocated to different functional modules for achievement as needed; in other words, the internal structure of the device is divided into different functional modules to achieve all or partial functions of the above. In addition, the aided translation device provided by the above embodiments shares the same conception with the embodiments of the aided translation method. Therefore, please refer to the embodiments of the method for the specific implementation process of the aided translation device and it will be no longer described herein.

Figure 6:
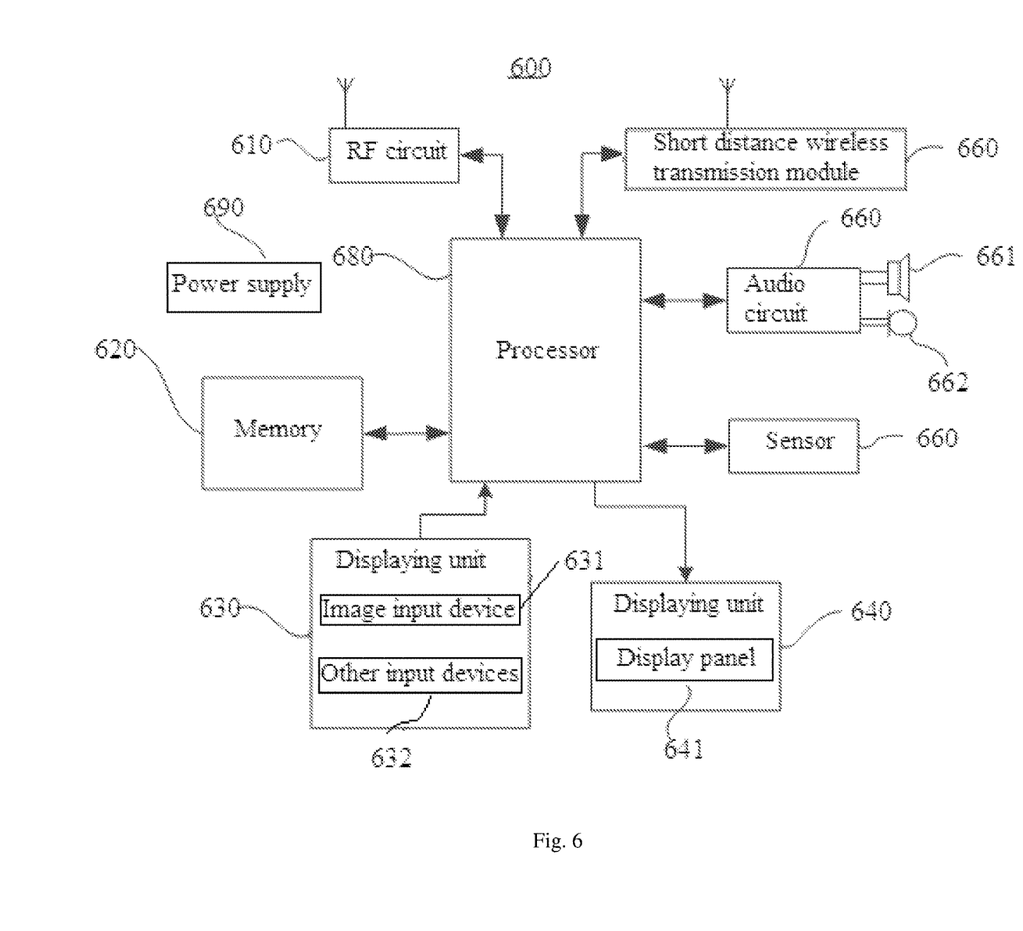
FIG. 6 is a structural block diagram of the mobile terminal provided by an embodiment of the Invention.

Please refer to FIG. 6, a structural block diagram of the mobile terminal provided by an embodiment of the Invention. Specifically:

Mobile terminal 600 can comprises such parts as a RF (Radio Frequency) circuit 610, a memory 620 with one or more computer readable storage media, an input unit 630, a displaying unit 640, a sensor 650, an audio circuit 660, a WiFi (wireless fidelity) module 670, a processor 680 with one or more processing cores and a power supply 690. A person skilled in the art can understand that, the structure of the mobile terminal as shown in FIG. 6 can include more or less parts than those shown in the figure, or the combination of some parts or arrangements of different parts, and thus does not form a restriction to the mobile terminal. Wherein:

The RF circuit 610 can be used for receiving and sending signals in the process of receiving and sending messages or communications; particularly, it receives the downlink message from the base station to handle it to one or more processors 680 for processing and sends the related uplink data to the base station. Generally, the RF circuit 610 includes but not limited to an antenna, at least one amplifier, a tuner, one or more oscillators, a subscriber identity module (SIM) card, a transceiver, a coupler, a LNA (Low Noise Amplifier) and a duplexer, etc. Moreover, the RF circuit 610 can also communicate with other devices through wireless communication and network. Wherein, the wireless communication can adopt any communication standards or protocols, including but not limited to GSM (Global System of Mobile communication), GPRS (General Packet Radio Service), WCDMA (Wideband Code Division Multiple Access), LTE (Long Term Evolution), E-mail and SMS (Short Messaging Service), etc.

The memory 620 can be used for storing software programs and modules; the processor 680 executes the functional applications and data processing by operating the software programs and modules stored in the memory 620. The memory 620 is mainly composed of a program storing area and a data storing area. Wherein, the program storing area can store an operation system and at least one function-needed application program (such as the functions of audio playing and image playing); the data storing area cam store the data created according to the use of the mobile terminal 600 (such as audio data and phone book, etc.). Moreover, the memory 620 can include a high-speed random access memory and also a nonvolatile memory, such as at least one disk memory device, a flash memory device and other nonvolatile solid-state memory devices. Accordingly, the memory 620 can also comprise a memory controller to provide the processor 680 and the input unit 630 for accessing the memory 620.

The input unit 630 can be used for receiving the inputted numbers or character information, and generating the signal inputs of the keyboard, the mouse, the function lever, the optics or trackball related to user's setting and functional control. Particularly, the input unit 630 can comprise an image input device 631 and other input device 632. The image input device 631 can be a camera, or a photoelectric scanning device. In addition to the image input device 631, the input unit 630 can comprise other input device 632. Particularly, the other input device 632 can include but not limited to one or more of the physical keyboard, the function keys (such as volume control buttons and switch buttons), the trackballs, the mouse and the function lever.

The displaying unit 640 can be used for displaying the information inputted by the user, or the information provided to the user, and all kinds of graphic user interfaces of the mobile terminal 600. These graphic user interfaces can be constituted by the graphics, text, icons, videos and other random combination. The displaying unit 640 can comprise a display panel 641; optionally, the forms as LCD (Liquid Crystal Display) and OLED (Organic Light-Emitting Diode) can be used for configuring the display panel 641.

The mobile terminal 600 can also comprise at least one type of sensor 650, such as a light sensor, a motion sensor and other sensors. Particularly, the light sensor can comprise an ambient light sensor and a proximity sensor; wherein, the ambient light sensor can adjust the brightness of the display panel 641 and the proximity sensor can close the display panel 641 and/or the backlight when the mobile terminal 600 moves close to the ear. As one of the motion sensor, the gravity acceleration sensor can detect the accelerated velocity in all directions (normally it is of three axes) and detect the magnitude and direction of the gravity in static state for the applications for identifying the posture of the mobile phone (such as horizontal/vertical screen switching, relevant games and magnetometer pose calibration) and related functions of vibration recognition (such as a pedometer and knocking), etc.; the configuration of the mobile terminal 600 with a gyroscope, a barometer, a hygrometer, a thermometer or an infrared sensor will be no longer described herein.

The audio interface between the user and the mobile terminal 600 can be provided by an audio circuit 660, a loudspeaker 661 and a microphone 622. The audio circuit 660 can convert the received audio data into electrical signal and transmit it to the loudspeaker 661 and the loudspeaker 661 converts the electrical signal into acoustical signal for output; on the other hand, the microphone 622 converts the collected acoustical signal into electrical signal; the audio circuit 660 receives the electrical signal and converts it into audio data; the processor 680 processes the output audio data and sends it to another mobile terminal through the RF circuit 610 for example, or outputs the audio data to the memory 620 for further processing. The audio circuit 660 can also comprise an earplug jack to provide the communication between the external-set headphones and the mobile terminal 600.

Through a WiFi module 660, which belongs to the short distance wireless transmission technology, the mobile terminal 600 can assist the user with receiving and sending E-mails, browsing webpage and accessing streaming media, etc. It provides the user the wireless accessing of broadband internet. It can be understood that, although the WiFi module 660 is shown in FIG. 6, it does not belong to the necessary part for constituting the mobile terminal and thus can be omitted within the scope of not changing the nature of the invention as needed.

As the control center of the mobile terminal 600, the processor 680 connects all parts of the entire mobile phone with all kinds of interfaces and lines and executes all functions and processing data of the mobile terminal 6200 through operating or executing the software programs and/or modules stored in the memory 620 and calling the data stored in the memory 620, and thus achieves overall monitoring on the mobile phone. Optionally, the processor 680 can comprise one or more processing cores; preferably, the processor 680 can be integrated with an application processor and a modem processor, wherein, the application processor is mainly used for processing the operation system, the user's interface and the application programs; the modem processor is mainly used for processing the wireless communication. It shall be understood that, the above modem processor may not be integrated into the processor 680.

The mobile terminal 600 also comprises a power supply 690 (such as batteries) for supplying power to each part; preferably, the power supply may be logically connected to the processor 680 through the power management system and achieve the functions as charging, discharging and power consumption management through the power management system. The power supply 690 can also comprise one or more DC or AC power systems, recharging systems, detection circuits for power failure, power converters or inverters and power status indicators.

Although it is not shown in the figure, the mobile terminal 600 can also comprise a Bluetooth module, etc. and it will be no longer described herein.

Particularly in the embodiments, the mobile terminal 600 also comprises a memory, one or more programs; wherein, one or more programs are stored in the memory and will be executed by one or more processors upon configuration. The above one or more programs contain the instructions to perform the following operations of:

obtaining a destination from the itinerary information of a user;

translating the pre-stored personal form-filling information of the user from a source language to a target language when the language of the destination is different from that of the user's usual place of residence, wherein, the target language is the language of the destination;

displaying the personal form-filling information in the target language.

It also contains the instructions to perform the following operations of:

obtaining the image containing the itinerary ticket of the user, identifies the itinerary information from the image and extracts the destination from the itinerary information;

or, obtaining the itinerary information of the user in electronic form; extracting the destination from the itinerary information.

It also contains the instructions to perform the following operations of:

shooting to obtain an image of the itinerary ticket in the shooting mode selected by the user, wherein, different types of the itinerary ticket have different shooting modes;

capturing at least one area for identification from the image using a template corresponding to the type of the itinerary ticket;

identifying the itinerary information from at least one area for identification.

It also contains the instructions to perform the following operations of:

obtaining the time information from the itinerary information;

translating the pre-stored personal form-filling information of the user from a source language to a target language when the language of the destination is different from that of the user's usual place of residence, wherein comprising the steps of:

sending the destination and the time information to a server;

receiving the personal form-filling information in the target language fed back by the server before the time specified by the time information; the personal form-filling information in the target language is obtained by translating the pre-stored personal form-filling information of the user from a source language with the server when the language of the destination is different from that of the user's usual place of residence;

buffering the personal form-filling information in the target language.

It also contains the instructions to perform the following operations of:

receiving the selection signal of the user in case there are multiple items of the personal form-filling information in the target language;

displaying the selected personal form-filling information in the target language in association with the form template corresponding to the destination based on the selection signal.

The serial numbers in the above embodiments of the Invention are just for description and do not represent the advantages and disadvantages of the embodiments.

A person skilled in the art can understand that all or partial steps to achieve the above embodiments can be completed through hardware, or completed through the hardware via relevant instructions of programs; the program can be stored in a computer readable storage medium and the storage medium can only be a read-only memory, a disk or a CD.

The above mentioned are the better embodiments of the Invention, not for limiting the Invention. Any amendment, equivalent replacement and improvement made within the range of the spirit and rule of the Invention shall be included in the protection scope of the Invention.

What is claimed is:

1. An aided translation method, wherein, the method comprises the steps of: shooting, via a processor, to obtain an image of an itinerary ticket of a category selected from multiple predefined categories, wherein the image of the itinerary ticket is shoot using a shooting mode selected, by a user, from a plurality of shooting modes, wherein each shooting mode is capable of shooting one or more itinerary tickets of similar category; determining, via the processor, a predetermined area for identification from the image of the itinerary ticket based upon a template selected from a plurality of predefined templates, wherein said template is selected according to a user's usual place of residence and the category associated with the itinerary ticket; extracting, via the processor, itinerary information for the user from the predetermined area for identification; obtaining, via the processor, a destination from the itinerary information of the user; translating, via the processor, pre-stored personal form-filling information of the user from a source language to a target language when a language of the destination is different from that of the user's usual place of residence, wherein, the target language is the language of the destination; buffering, via the processor, the personal form filing information translated in the target language; and displaying, via the processor, the personal form-filling information in the target language.

2. The method according to claim 1, wherein, the method further comprises the steps of: obtaining time information from the itinerary information; translating the pre-stored personal form-filling information of the user from a source language to a target language when the language of the destination is different from that of the user's usual place of residence, wherein comprising the steps of: sending the destination and the time information to a server; receiving the personal form-filling information in the target language fed back by the server before the time specified by the time information; the personal form-filling information in the target language is obtained by translating the pre-stored personal form-filling information of the user from a source language with the server when the language of the destination is different from that of the user's usual place of residence; buffering the personal form-filling information in the target language.

3. The method according to claim 1, wherein, the step of displaying the personal form-filling information in the target language comprises the steps of: receiving a selection signal of the user in case there are one or more items of the personal form-filling information in the target language; displaying the selected personal form-filling information in the target language in association with a form template corresponding to the destination based on the selection signal.

4. An aided translation device, wherein, the device comprises: a processor; and a memory coupled with the processor, wherein the processor executes programmed instructions stored in the memory for shooting to obtain an image of an itinerary ticket of a category selected from multiple predefined categories, wherein the image of the itinerary ticket is shoot via a shooting mode selected, by a user, from a plurality of shooting modes, wherein each shooting mode is capable of shooting one or more itinerary tickets of similar category; determining a predetermined area for identification from the image of the itinerary ticket based upon a template selected from a plurality of predefined templates, wherein said template is selected according to a user's usual place of residence and the category associated with the itinerary ticket; extracting itinerary information for the user from the predetermined area for identification; obtaining a destination from the itinerary information of the user; translating pre-stored personal form-filling information of the user from a source language to a target language when a language of the destination is different from that of the user's usual place of residence, wherein, the target language is the language of the destination; buffering the personal form filing information translated in the target language; and displaying the personal form-filling information in the target language.

5. The device according to claim 4, wherein, the processor further executes programmed instructions for obtaining time information from the itinerary information; sending the destination and the time information to a server; receiving the personal form-filling information in the target language fed back by the server before the time specified by the time information, wherein the personal form-filling information in the target language is obtained by translating the pre-stored personal form-filling information of the user from a source language with the server when the language of the destination is different from that of the user's usual place of residence; and buffering the personal form-filling information in the target language.

6. The device according to claim 4, wherein, the processor further executes programmed instructions for receiving a selection signal of the user in case there are one or more items of personal form-filling information in the target language; and displaying the selected personal form-filling information in the target language in association with a form template corresponding to the destination based on the selection signal.

* * * * *